US011705559B2

(12) United States Patent
Sato (10) Patent No.: US 11,705,559 B2
(45) Date of Patent: Jul. 18, 2023

(54) FUEL CELL SYSTEM

(71) Applicant: TOYOTA JIDOSHA KABUSHIKI KAISHA, Toyota (JP)

(72) Inventor: Hiromichi Sato, Adano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/651,860

(22) Filed: Feb. 21, 2022

(65) Prior Publication Data

US 2022/0271307 A1 Aug. 25, 2022

(30) Foreign Application Priority Data

Feb. 24, 2021 (JP) ................... 2021-027266

(51) Int. Cl.
*H01M 8/04* (2016.01)
*H01M 8/04007* (2016.01)
*H01M 8/04701* (2016.01)

(52) U.S. Cl.
CPC ... *H01M 8/04074* (2013.01); *H01M 8/04037* (2013.01); *H01M 8/04723* (2013.01)

(58) Field of Classification Search
CPC ......... H01M 8/04074; H01M 8/04037; H01M 8/04723

See application file for complete search history.

(56) References Cited

U.S. PATENT DOCUMENTS

2009/0208796 A1 8/2009 Matsuo
2017/0069920 A1* 3/2017 Sakakibara ....... H01M 8/04358

FOREIGN PATENT DOCUMENTS

JP 2004039560 A 2/2004
JP 2014197543 A 10/2014
JP 2017054648 A 3/2017

* cited by examiner

*Primary Examiner* — Olatunji A Godo
(74) *Attorney, Agent, or Firm* — Dickinson Wright, PLLC (57) ABSTRACT

To provide a fuel cell system configured to achieve both rapid cooling of a fuel cell at high temperatures and rapid heating of the fuel cell at the time of system start-up. In the fuel cell system, by controlling a three-way valve, a controller switches to any one of the following circulation systems: radiator circulation in which a refrigerant flows to a radiator through a first flow path, and third flow path circulation in which the refrigerant bypasses the radiator and flows to a second flow path through a third flow path; when the temperature of the refrigerant is equal to or less than a low temperature threshold, the controller switches from the radiator circulation to the third flow path circulation and closes a first valve; and when the temperature of the refrigerant becomes equal to or more than a high temperature threshold, the controller opens the first valve and circulate the refrigerant to flow through the reserve tank.

2 Claims, 4 Drawing Sheets

FUEL CELL SYSTEM

The disclosure relates to a fuel cell system.

BACKGROUND

A fuel cell (FC) is a power generation device that generates electrical energy by electrochemical reaction between fuel gas (e.g., hydrogen) and oxidant gas (e.g., oxygen) in a single unit fuel cell or a fuel cell stack (hereinafter, it may be simply referred to as "stack") composed of stacked unit fuel cells (hereinafter may be referred to as "cell"). In many cases, the fuel gas and oxidant gas actually supplied to the fuel cell are mixtures with gases that do not contribute to oxidation and reduction. Especially, the oxidant gas is often air containing oxygen.

Hereinafter, fuel gas and oxidant gas may be collectively and simply referred to as "reaction gas" or a "gas". Also, a single unit fuel cell and a fuel cell stack composed of stacked unit fuel cells may be collectively referred to as "fuel cell".

In general, the unit fuel cell includes a membrane-electrode assembly (MEA).

The membrane electrode assembly has a structure such that a catalyst layer and a gas diffusion layer (or GDL, hereinafter it may be simply referred to as "diffusion layer") are sequentially formed on both surfaces of a solid polymer electrolyte membrane (hereinafter, it may be simply referred to as "electrolyte membrane"). Accordingly, the membrane electrode assembly may be referred to as "membrane electrode gas diffusion layer assembly" (MEGA).

As needed, the unit fuel cell includes two separators sandwiching both sides of the membrane electrode gas diffusion layer assembly. In general, the separators have a structure such that a groove is formed as a reaction gas flow path on a surface in contact with the gas diffusion layer. The separators have electronic conductivity and function as a collector of generated electricity.

In the fuel electrode (anode) of the fuel cell, hydrogen ($H_2$) as the fuel gas supplied from the gas flow path and the gas diffusing layer, is protonated by the catalytic action of the catalyst layer, and the protonated hydrogen goes to the oxidant electrode (cathode) through the electrolyte membrane. An electron is generated at the same time, and it passes through an external circuit, does work, and then goes to the cathode. Oxygen ($O_2$) as the oxidant gas supplied to the cathode reacts with protons and electrons in the catalytic layer of the cathode, thereby generating water. The generated water gives appropriate humidity to the electrolyte membrane, and excess water penetrates the gas diffusion layer and then is discharged to the outside of the system.

Various studies have been made on fuel cell systems configured to be installed and used in fuel cell electric vehicles (hereinafter may be referred to as "vehicle"). A solid polymer electrolyte membrane generally operates at an operation temperature of about 80° C. Accordingly, during normal operation, it is desired that reaction heat generated in the fuel cell itself is released to the outside via cooling liquid to maintain the operation temperature, and the cooling liquid is rapidly heated to the operation temperature at the time of low-temperature start-up.

For example, Patent Literature 1 discloses the following technique: an on-off valve is disposed between a radiator and a reserve tank; when a stack temperature is not high, the valve is closed to confine low-temperature cooling water in the reserve tank; and when the stack temperature rises, the valve is opened to utilize the low-temperature cooling water in the reserve tank for cooling the stack.

Patent Literature 2 discloses a fuel cell system for reducing degradation of an antifreeze solution for cooling a fuel cell body and reducing a radiation load on a radiator.

Patent Literature 3 discloses such a cooling system, that in a vehicle equipped with a fuel cell and a vehicle control system, the cooling system cools down the temperature of the fuel cell to ambient level when the connection between the fuel cell and the load circuit of the vehicle is interrupted by a shutoff signal command emitted by the vehicle control system of the vehicle.

Patent Literature 1: Japanese Patent Application Laid-Open (JP-A) No. 2017-054648

Patent Literature 2: JP-A No. 2004-039560

Patent Literature 3: JP-A No. 2014-197543

The structure and control of the cooling circuit of Patent Literature 1 can adapt to rapid cooling; however, there is a possibility that it cannot adapt to rapid heating at low temperatures. For rapid heating at low temperatures, it is necessary to reduce the heat capacity of the cooling system, that is, to reduce the volume of the cooling system. In Patent Literature 1, there is a bypass path that bypasses the radiator, and there is a possibility that the volume of the cooling system can be reduced by using the bypass path only at low temperatures. However, the bypass path and a path leading from the bypass path to the reserve tank form a parallel circuit, and it is highly likely that the cooling water will also turn to the reserve tank. Accordingly, the volume of the cooling system becomes large and may hinder rapid heating.

SUMMARY

The disclosed embodiments were achieved in light of the above circumstances. An object of the disclosed embodiments is to provide a fuel cell system configured to achieve both rapid cooling of the fuel cell at high temperatures and rapid heating of the fuel cell at the time of system start-up.

In a first embodiment, there is provided a fuel cell system comprising a fuel cell, a radiator, a thermometer, a reserve tank, a first flow path (an upstream pipe), a second flow path (a downstream pipe), a three-way valve, a third flow path (a bypass pipe), a refrigerant circulation pump, a fourth flow path (a pipe a), a fifth flow path (a pipe c) and a controller, wherein the radiator decreases a temperature of a refrigerant for cooling the fuel cell;

wherein the thermometer measures the temperature of the refrigerant;

wherein the reserve tank stores the refrigerant;

wherein the first flow path (the upstream pipe) allows the refrigerant to flow from the fuel cell to the radiator, wherein the second flow path (the downstream pipe) allows the refrigerant to flow from the radiator to the fuel cell, wherein the three-way valve is disposed in the first flow path and branches the first flow path;

wherein the third flow path (the bypass pipe) allows the refrigerant to bypass the radiator and flow from the three-way valve to the second flow path;

wherein the refrigerant circulation pump is disposed downstream from a junction of the second flow path with the third flow path;

wherein the fourth flow path (the pipe a) allows the refrigerant to flow from the first or third flow path to the reserve tank;

wherein the fifth flow path (the pipe c) allows the refrigerant to flow from the reserve tank to the second flow path, or it allows the refrigerant to flow from the reserve tank to downstream from a branch point of the third flow path to the fourth flow path;

wherein at least one flow path selected from the group consisting of the fourth flow path and the fifth flow path includes a first valve;

wherein, by controlling the three-way valve, the controller switches to any one of the following circulation systems: radiator circulation in which the refrigerant flows to the radiator through the first flow path, and third flow path circulation in which the refrigerant bypasses the radiator and flows to the second flow path through the third flow path;

wherein, when the temperature of the refrigerant is equal to or less than a low temperature threshold, the controller switches from the radiator circulation to the third flow path circulation and closes the first valve; and wherein, when the temperature of the refrigerant becomes equal to or more than a high temperature threshold, the controller opens the first valve and circulate the refrigerant to flow through the reserve tank.

The fourth flow path may include the first valve.

The fuel cell system may include a sixth flow path (a pipe b) through which the refrigerant flows from an inlet or outlet of the radiator to the reserve tank.

The sixth flow path (the pipe b) may include a second valve; when the temperature of the refrigerant is equal to or less than the low temperature threshold, the controller may switch from the radiator circulation to the third flow path circulation and close the first valve and the second valve; and when the temperature of the refrigerant becomes equal to or more than the high temperature threshold, the controller may open the first valve and the second valve and circulate the refrigerant to flow through the reserve tank.

According to the fuel cell system of the disclosed embodiments, both rapid cooling of the fuel cell at high temperatures and rapid heating of the fuel cell at the time of system start-up, can be achieved.

BRIEF DESCRIPTION OF THE DRAWINGS

In the accompanying drawings.

DETAILED DESCRIPTION

The fuel cell system of the disclosed embodiments is a fuel cell system comprising a fuel cell, a radiator, a thermometer, a reserve tank, a first flow path (an upstream pipe), a second flow path (a downstream pipe), a three-way valve, a third flow path (a bypass pipe), a refrigerant circulation pump, a fourth flow path (a pipe a), a fifth flow path (a pipe c) and a controller, wherein the radiator decreases a temperature of a refrigerant for cooling the fuel cell;

wherein the thermometer measures the temperature of the refrigerant;

wherein the reserve tank stores the refrigerant;

wherein the first flow path (the upstream pipe) allows the refrigerant to flow from the fuel cell to the radiator, wherein the second flow path (the downstream pipe) allows the refrigerant to flow from the radiator to the fuel cell, wherein the three-way valve is disposed in the first flow path and branches the first flow path;

wherein the third flow path (the bypass pipe) allows the refrigerant to bypass the radiator and flow from the three-way valve to the second flow path;

wherein the refrigerant circulation pump is disposed downstream from a junction of the second flow path with the third flow path;

wherein the fourth flow path (the pipe a) allows the refrigerant to flow from the first or third flow path to the reserve tank;

wherein the fifth flow path (the pipe c) allows the refrigerant to flow from the reserve tank to the second flow path, or it allows the refrigerant to flow from the reserve tank to downstream from a branch point of the third flow path to the fourth flow path;

wherein at least one flow path selected from the group consisting of the fourth flow path and the fifth flow path includes a first valve;

wherein, by controlling the three-way valve, the controller switches to any one of the following circulation systems: radiator circulation in which the refrigerant flows to the radiator through the first flow path, and third flow path circulation in which the refrigerant bypasses the radiator and flows to the second flow path through the third flow path;

wherein, when the temperature of the refrigerant is equal to or less than a low temperature threshold, the controller switches from the radiator circulation to the third flow path circulation and closes the first valve; and wherein, when the temperature of the refrigerant becomes equal to or more than a high temperature threshold, the controller opens the first valve and circulate the refrigerant to flow through the reserve tank.

In Patent Literature 1, since the pressure loss in the section between "the connection point of the pipe leading from the bypass circuit to the reserve tank" and "the connection point of the pipe leading from the reserve tank to the inlet of the pump" is extremely small, water at a flow rate that allows air bleeding does not flow into the reserve tank. Failure in air bleeding causes a decrease in the amount of supplied water, which is due to air entrainment in the pump, and thereby a decrease in cooling performance. If a pressure loss unit is disposed in the above section to avoid this, the overall pressure loss is increased. Accordingly, it is necessary to increase the pump capacity.

Since the pipe connecting the radiator and the reserve tank is closed by the valve except during high-temperature operation, air bleeding of the radiator circuit is not allowed except during high-temperature operation.

At the time of start-up at freezing temperatures, the warm-up time is increased because the cooling water flowing through the bypass circuit pushes the cooled cooling water in the reserve tank into the circuit.

According to the fuel cell system of the disclosed embodiments, both rapid cooling of the fuel cell at high temperatures and rapid heating of the fuel cell at the time of system start-up, can be achieved.

In the disclosed embodiments, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

In general, the fuel cell system of the disclosed embodiments is installed and used in a vehicle including a motor as a driving source.

The fuel cell system of the disclosed embodiments may be installed and used in a vehicle that can be run by the power of a secondary cell.

The motor is not particularly limited, and it may be a conventionally-known driving motor.

The vehicle may be a fuel cell electric vehicle.

The vehicle may include the fuel cell system of the disclosed embodiments.

The fuel cell system of the disclosed embodiments includes the fuel cell.

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer". As the anode catalyst and the cathode catalyst, examples include, but are not limited to, platinum (Pt) and ruthenium (Ru). As a catalyst-supporting material and a conductive material, examples include, but are not limited to, a carbon material such as carbon.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the disclosed embodiments, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, and aluminum plate and a stainless-steel plate) obtained by press-molding. The separator may function as a collector.

The fuel cell stack may include a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

As the cooling system of the fuel cell, the fuel cell system includes the radiator, the thermometer, the reserve tank, the first flow path, the second flow path, the three-way valve, the third flow path, the refrigerant circulation pump, the fourth flow path, the fifth flow path and the controller.

The radiator decreases the temperature of the refrigerant for cooling the fuel cell.

The thermometer measures the temperature of the refrigerant.

The thermometer is electrically connected to the controller. The thermometer may send a measurement result to the controller, and the controller may detect the refrigerant temperature measured by the thermometer. The position to dispose the thermometer is not particularly limited, as long as the temperature of the refrigerant can be measured. From the viewpoint of increasing the measurement accuracy of the refrigerant temperature, the thermometer may be disposed in the first flow path.

The reserve tank stores the refrigerant. The reserve tank may store air. The reserve tank may maintain the temperature of the refrigerant at a low temperature.

The first flow path (the upstream pipe) connects the radiator and the refrigerant outlet of the fuel cell to allow the refrigerant to flow from the fuel cell to the radiator.

The second flow path (the downstream pipe) connects the radiator and the refrigerant inlet of the fuel cell to allow the refrigerant to flow from the radiator to the fuel cell.

The three-way valve is disposed in the first flow path and branches the first flow path.

The three-way valve is electrically connected to the controller. The opening and closing of the three-way valve is controlled according to a control signal from the controller.

By controlling the three-way valve, the controller can switch to any one of the following circulation systems: the radiator circulation in which the refrigerant flows to the radiator through the first flow path, and the third flow path circulation in which the refrigerant bypasses the radiator and flows to the second flow path through the third flow path.

When the refrigerant temperature is equal to or more than the high temperature threshold (e.g., 50° C.), the controller may switch the three-way valve to the radiator circulation.

When the refrigerant temperature is equal to or less than the low temperature threshold (e.g., 40° C.), the controller may switch the three-way valve to the third flow path circulation.

The third flow path (the bypass pipe) connects the first flow path and the second flow path, and it allows the refrigerant to bypass the radiator and flow from the three-way valve to the second flow path.

The second flow path includes the junction with the third flow path.

The refrigerant circulation pump is disposed downstream from the junction of the second flow path with the third flow path.

The refrigerant circulation pump is electrically connected to the controller. The driving of the refrigerant circulation pump is controlled according to a control signal from the controller.

The fourth flow path (the pipe a) connects the first or third flow path and the reserve tank, and it allows the refrigerant to flow from the first or third flow path to the reserve tank.

The first or third flow path includes the branch point to the fourth flow path.

The branch point of the first flow path to the fourth flow path may be disposed upstream from the three-way valve, from the viewpoint of enabling rapid heating at the time of system start-up.

The fifth flow path (the pipe c) connects the reserve tank and the second flow path, or it connects the reserve tank with a region downstream from the branch point of the third flow path to the fourth flow path. The fifth flow path (the pipe c) allows the refrigerant to flow from the reserve tank to the second flow path, or it allows the refrigerant to flow from the reserve tank to downstream from the branch point of the third flow path to the fourth flow path.

At least one flow path selected from the group consisting of the fourth flow path and the fifth flow path includes the first valve. From the viewpoint of enabling rapid cooling at high temperatures and rapid heating at the time of system start-up, the fourth flow path may include the first valve.

The first valve is electrically connected to the controller. The opening and closing of the first valve is controlled according to a control signal from the controller. By opening the first valve, air bleeding of the third flow path and radiator is facilitated, allowing for rapid cooling at high temperatures and rapid heating at the time of system start-up.

The controller may open the first valve when the refrigerant temperature is equal to or less than the low temperature threshold (e.g., 40° C.). The controller may open the first valve when the three-way valve is switched to the third flow path circulation. The controller may open the first valve when the refrigerant temperature is equal to or less than the low temperature threshold (e.g., 40° C.) and when the three-way valve is switched to the third flow path circulation.

The fuel cell system may include the sixth flow path (the pipe b) from the viewpoint of enabling rapid cooling at high temperatures. The sixth flow path connects the inlet or outlet of the radiator and the reserve tank and allows the refrigerant to flow from the inlet or outlet of the radiator to the reserve tank. The sixth flow path allows the refrigerant to flow from the radiator to the reserve tank, when the three-way valve is switched to the radiator circulation at high temperatures and the refrigerant circulates in the route of the first flow path—the radiator—the second flow path.

The sixth flow path may include the second valve from the viewpoint of enabling rapid cooling at high temperatures.

The second valve is electrically connected to the controller. The opening and closing of the second valve is controlled according to a control signal from the controller. By opening the second valve, air bleeding of the radiator is facilitated, allowing for rapid cooling at high temperatures.

The controller may open the second valve when the refrigerant temperature is equal to or more than the high temperature threshold (e.g., 50° C.). The controller may open the second valve when the three-way valve is switched to the radiator circulation. The controller may open the second valve when the refrigerant temperature is equal to or more than the high temperature threshold and when the three-way valve is switched to the radiator circulation.

As the first valve and the second valve, examples include, but are not limited to, an electromagnetic valve and a thermostatic valve.

As the fuel gas system of the fuel cell, the fuel cell system may include a fuel gas supply portion, a fuel gas supply flow path, and a fuel off-gas discharge flow path.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply may be controlled by controlling the opening and closing of the main shutoff valve of the fuel gas supplier according to a control signal from the controller.

The fuel gas supply flow path connects the fuel gas inlet of the fuel cell and the fuel gas supplier. The fuel gas supply flow path allows the fuel gas to be supplied to the anode of the fuel cell. The fuel gas inlet may be the fuel gas supply hole, the anode inlet manifold or the like.

The fuel off-gas discharge flow path may be connected to the fuel gas outlet of the fuel cell. The fuel off-gas discharge flow path discharges the fuel off-gas, which is the fuel gas discharged from the anode of the fuel cell, to the outside. The fuel gas outlet may be the fuel gas discharge hole, the anode outlet manifold or the like.

The fuel off-gas discharge flow path may include a fuel off-gas discharge valve (a vent and discharge valve).

The fuel off-gas discharge valve allows the fuel off-gas, water and the like to be discharged to the outside (of the system). The outside may be the outside of the fuel cell system, or it may be the outside of the vehicle.

The fuel off-gas discharge valve may be electrically connected to the controller, and the flow rate of the fuel off-gas discharged to the outside may be controlled by controlling the opening and closing of the fuel off-gas discharge valve by the controller. By controlling the opening degree of the fuel off-gas discharge valve, the pressure of the fuel gas supplied to the anode (anode pressure) may be controlled.

The fuel off-gas may include the fuel gas that has passed through the anode without reacting, and the water generated at the cathode and delivered the anode. In some cases, the fuel off-gas includes corroded substances generated in the catalyst layer, the electrolyte membrane and the like, and the oxidant gas that may be supplied to the anode during a purge.

As the oxidant gas system of the fuel cell, the fuel cell system may include an oxidant gas supplier, an oxidant gas supply flow path, and an oxidant off-gas discharge flow path.

The oxidant gas supplier supplies the oxidant gas to the fuel cell. More specifically, the oxidant gas supplier supplies the oxidant gas to the cathode of the fuel cell.

As the oxidant gas supplier, for example, an air compressor may be used.

The oxidant gas supplier is electrically connected to the controller. The oxidant gas supplier is driven according to a control signal from the controller. At least one selected from the group consisting of the flow rate and pressure of the oxidant gas supplied from the oxidant gas supplier to the cathode, may be controlled by the controller.

The oxidant gas supply flow path connects the oxidant gas supplier and the oxidant gas inlet of the fuel cell. The oxidant gas supply flow path allows the oxidant gas to be supplied from the oxidant gas supplier to the cathode of the fuel cell. The oxidant gas inlet may be the oxidant gas supply hole, the cathode inlet manifold or the like.

The oxidant off-gas discharge flow path is connected to the oxidant gas outlet of the fuel cell. The oxidant off-gas discharge flow path allows the oxidant off-gas, which is the oxidant gas discharged from the cathode of the fuel cell, to be discharged to the outside. The oxidant gas outlet may be the oxidant gas discharge hole, the cathode outlet manifold or the like.

The oxidant off-gas discharge flow path may be provided with an oxidant gas pressure control valve.

The oxidant gas pressure control valve is electrically connected to the controller. By opening the oxidant gas pressure control valve by the controller, the oxidant off-gas, which is the reacted oxidant gas, is discharged to the outside from the oxidant off-gas discharge flow path. The pressure of the oxidant gas supplied to the cathode (cathode pressure) may be controlled by controlling the opening degree of the oxidant gas pressure control valve.

The fuel cell system may include a secondary cell.

The secondary cell (battery) may be any chargeable and dischargeable cell. For example, the secondary cell may be a conventionally-known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the motor, the oxidant gas supplier and the like. The secondary cell may be rechargeable by a power source outside the vehicle, such as a household power supply. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be installed in the vehicle. The controller may be operable by an external power supply even if the ignition switch is turned off.

When the temperature of the refrigerant is equal to or less than the low temperature threshold, by the three-way valve, the controller stops the flow of the refrigerant from the first flow path to the radiator, connects the first flow path and the third flow path, closes the first valve, and circulates the refrigerant through the fuel cell, the first flow path, the third flow path and the second flow path.

When the temperature of the refrigerant becomes equal to or more than the high temperature threshold, the controller opens the first valve and circulates the refrigerant to flow through the reserve tank.

The low temperature threshold may be a temperature lower than the high temperature threshold. For example, the low temperature threshold may be 40° C. or less, 20° C. or less, 10° C. or less, or 0° C. or less.

The high temperature threshold may be a temperature higher than the low temperature threshold. For example, the high temperature threshold may be 10° C. or more, 20° C. or more, 30° C. or more, 50° C. or more, 60° C. or more, or 80° C. or more.

When the sixth flow path includes the second valve and when the temperature of the refrigerant is equal to or less than the low temperature threshold, by the three-way valve, the controller may stop the flow of the refrigerant from the first flow path to the radiator, connect the first flow path and the third flow path, close the first valve and the second valve, and circulate the refrigerant through the fuel cell, the first flow path, the third flow path and the second flow path.

When the temperature of the refrigerant becomes equal to or more than the high temperature threshold, the controller may open the first valve and the second valve and circulate the refrigerant to flow through the reserve tank.

Figure 1:
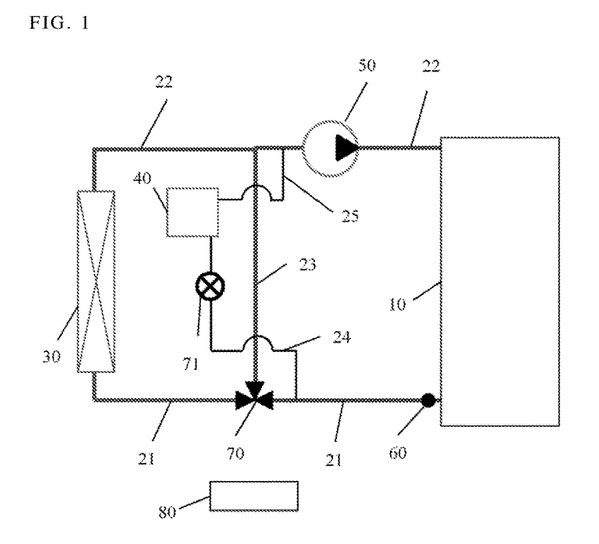
FIG. 1 is a schematic configuration diagram of an example of the fuel cell system of the disclosed embodiments.

FIG. 1 is a schematic configuration diagram of an example of the fuel cell system of the disclosed embodiments.

The fuel cell system shown in FIG. 1 includes a fuel cell 10, a first flow path 21, a second flow path 22, a third flow path 23, a fourth flow path 24, a fifth flow path 25, a radiator 30, a reserve tank 40, a refrigerant circulation pump 50, a thermometer 60, a three-way valve 70, a first valve 71 and a controller 80. In FIG. 1, only the cooling system is illustrated, and other systems such as the oxidant gas system and the fuel gas system are not illustrated.

The controller 80 is electrically connected to the refrigerant circulation pump 50, the thermometer 60, the three-way valve 70 and the first valve 71 to control the driving of them.

Figure 2:
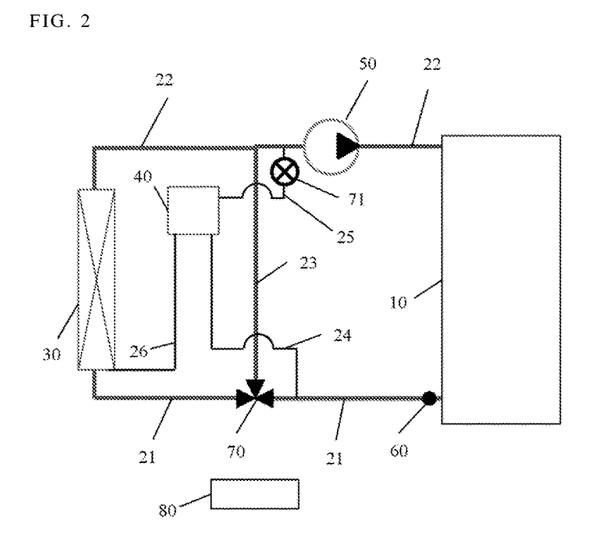
FIG. 2 is a schematic configuration diagram of another example of the fuel cell system of the disclosed embodiments.

FIG. 2 is a schematic configuration diagram of another example of the fuel cell system of the disclosed embodiments.

Compared to the fuel cell system shown in FIG. 1, in the fuel cell system shown in FIG. 2, the first valve 71 is disposed in the third flow path 23, instead of disposing the first valve 71 in the first flow path 21. In addition, the fuel cell system shown in FIG. 2 includes a sixth flow path 26 for connecting the radiator 30 and the reserve tank 40.

If there is the fourth flow path 24, air can be bled from the radiator at a high temperature, and heat dissipation is assisted. Accordingly, the sixth flow path 26 may be present or absent in the fuel cell system. A slight amount of the refrigerant flows through the first flow path 21, the reserve tank 40, the radiator 30 and the refrigerant circulation pump 50 in this order. Accordingly, from the viewpoint of enhancing heat dissipation efficiency, the first valve 71 may be disposed in the first flow path 21.

Figure 3:
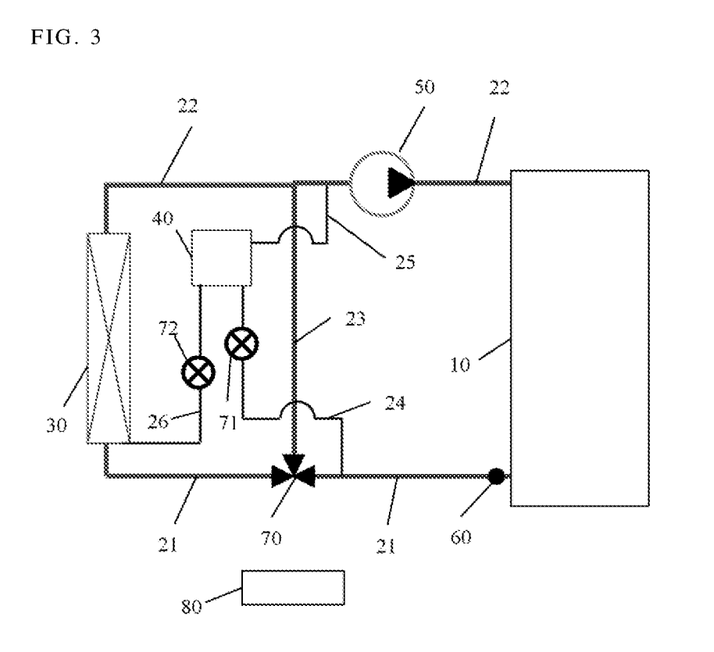
FIG. 3 is a schematic configuration diagram of another example of the fuel cell system of the disclosed embodiments.

FIG. 3 is a schematic configuration diagram of another example of the fuel cell system of the disclosed embodiments.

Compared to the fuel cell system shown in FIG. 1, the fuel cell system shown in FIG. 3 further includes the sixth flow path 26 connecting the radiator 30 and the reserve tank 40. A second valve 72 is disposed in the sixth flow path 26.

The controller 80 is electrically connected to the refrigerant circulation pump 50, the thermometer 60, the three-way valve 70, the first valve 71 and the second valve 72 to control the driving of them.

Figure 4:
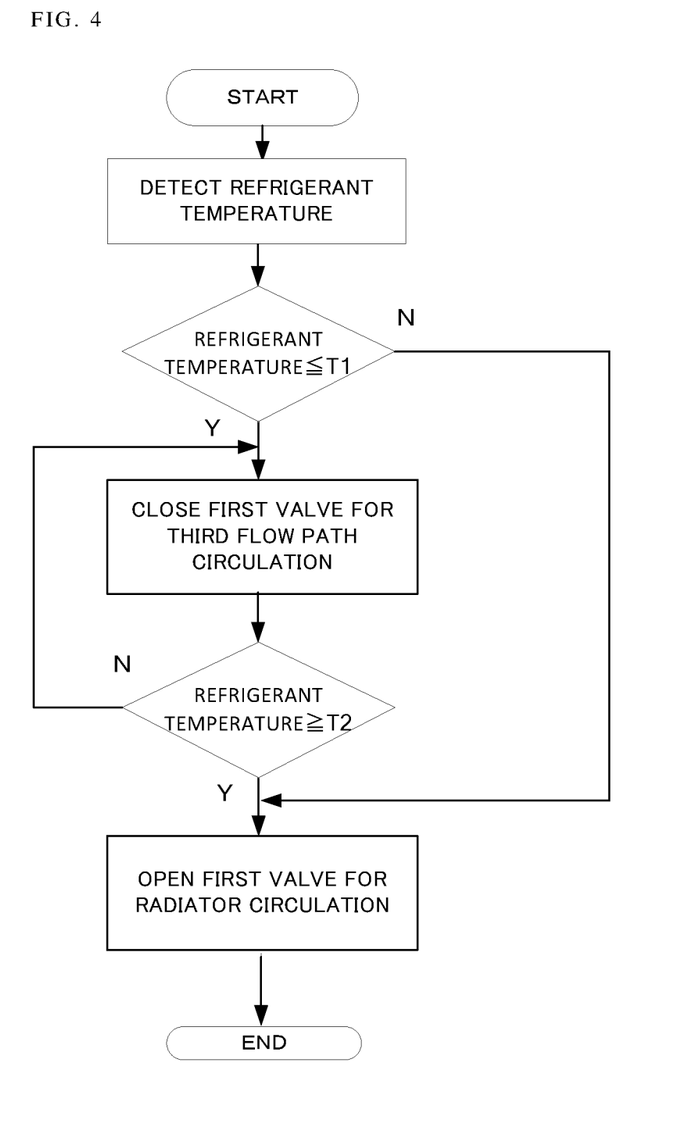
FIG. 4 is a flowchart illustrating an example of the control of the fuel cell system of the disclosed embodiments.

FIG. 4 is a flowchart illustrating an example of the control of the fuel cell system of the disclosed embodiments.

(1) Judgment of Low Temperature Threshold (T1)

The controller judges whether or not the temperature of the refrigerant is equal to or less than the low temperature threshold (T1).

When the temperature of the refrigerant is judged to be equal to or less than the low temperature threshold, by the three-way valve, the controller stops the flow of the refrigerant from the first flow path to the radiator and connects the first flow path and the third flow path. Then, the controller closes the first valve and circulates the refrigerant between the fuel cell, the first flow path, the third flow path and the second flow path. That is, when the temperature of the refrigerant is judged to be equal to or less than the low temperature threshold, the controller switches the three-way valve to the third flow path circulation and closes the first valve. By closing the first valve and performing the third flow path circulation, the supply of the refrigerant from the reserve tank can be stopped; the temperature of the refrigerant can be rapidly increased; and the fuel cell start-up time can be shortened. At this time, if the sixth flow path includes the second valve, the controller may close the second valve.

When the temperature of the refrigerant is judged to exceed the low temperature threshold, the controller opens the first valve. At this time, the controller may switch the three-way valve to the radiator circulation. At this time, if the sixth flow path includes the second valve, the controller may also open the second valve from the viewpoint of enhancing a heat dissipation effect.

(2) Judgment of High Temperature Threshold (T2)

After the temperature of the refrigerant is judged to be equal to or less than the low temperature threshold and after the elapse of a predetermined time, the controller judges whether or not the temperature of the refrigerant has become equal to or more than the high temperature threshold (T2).

Until the temperature of the refrigerant becomes equal to or more than the high temperature threshold, the controller closes the first valve and maintain the third flow path circulation of the three-way valve. At this time, if the sixth flow path includes the second valve, the controller may also close the second valve.

When the temperature of the refrigerant is judged to be equal to or more than the high temperature threshold, the controller opens the first valve and circulates the refrigerant to flow through the reserve tank. At this time, the controller may switch the three-way valve to the radiator circulation. At this time, if the sixth flow path includes the second valve, the controller may also open the second valve from the viewpoint of enhancing the heat dissipation effect. By opening the first valve, air can be bled from the third flow path and the radiator. Accordingly, heat dissipation performance can be enhanced.

As a result of the above control, at the time of start-up at freezing temperatures (such as the case where the outside air temperature is below the freezing point and the cooling water temperature is equal to or less than the low temperature threshold), the time required for the start-up can be reduced by closing the first valve.

The low temperature threshold (T1) may be set to a temperature lower than the high temperature threshold (T2).

For example, the low temperature threshold (T1) may be 0° C. or less, and the high temperature threshold (T2) may be 10° C. or more. The predetermined time may be appropriately set according to the target temperature or the like of the refrigerant.

(0) Judgment of the Outside Air Temperature (T0)

As needed, the judgment of the outside air temperature may be performed before the low temperature threshold judgment (1) described above. The low temperature threshold judgment can be accurately performed by performing the outside air temperature judgment before the low temperature threshold judgment.

That is, the controller may judge whether or not the outside air temperature is equal to or less than a predetermined temperature (T0).

When the outside air temperature is judged to exceed the predetermined temperature T0, the controller opens the first valve. At this time, the controller may switch the three-way valve to the radiator circulation. At this time, when the sixth flow path includes the second valve, the controller may also open the second valve from the viewpoint of enhancing the heat dissipation effect.

When the outside air temperature is judged to be equal to or less than the predetermined temperature T0, the controller may perform the above-described low temperature threshold judgment (1).

The outside air temperature may be measured by the thermometer.

The predetermined temperature T0 of the outside air temperature may be 10° C. or less, or it may be 0° C. or less, for example.

In some cases, the refrigerant temperature is low even when the outside air temperature is rising. To reduce the time required for the refrigerant temperature to exceed 0° C., the low temperature threshold T1 may be set to 0° C.; the predetermined temperature T0 of the outside air temperature may be set to 10° C.; or the high temperature threshold T2 may be set to 10° C., for example.

Figure 5:
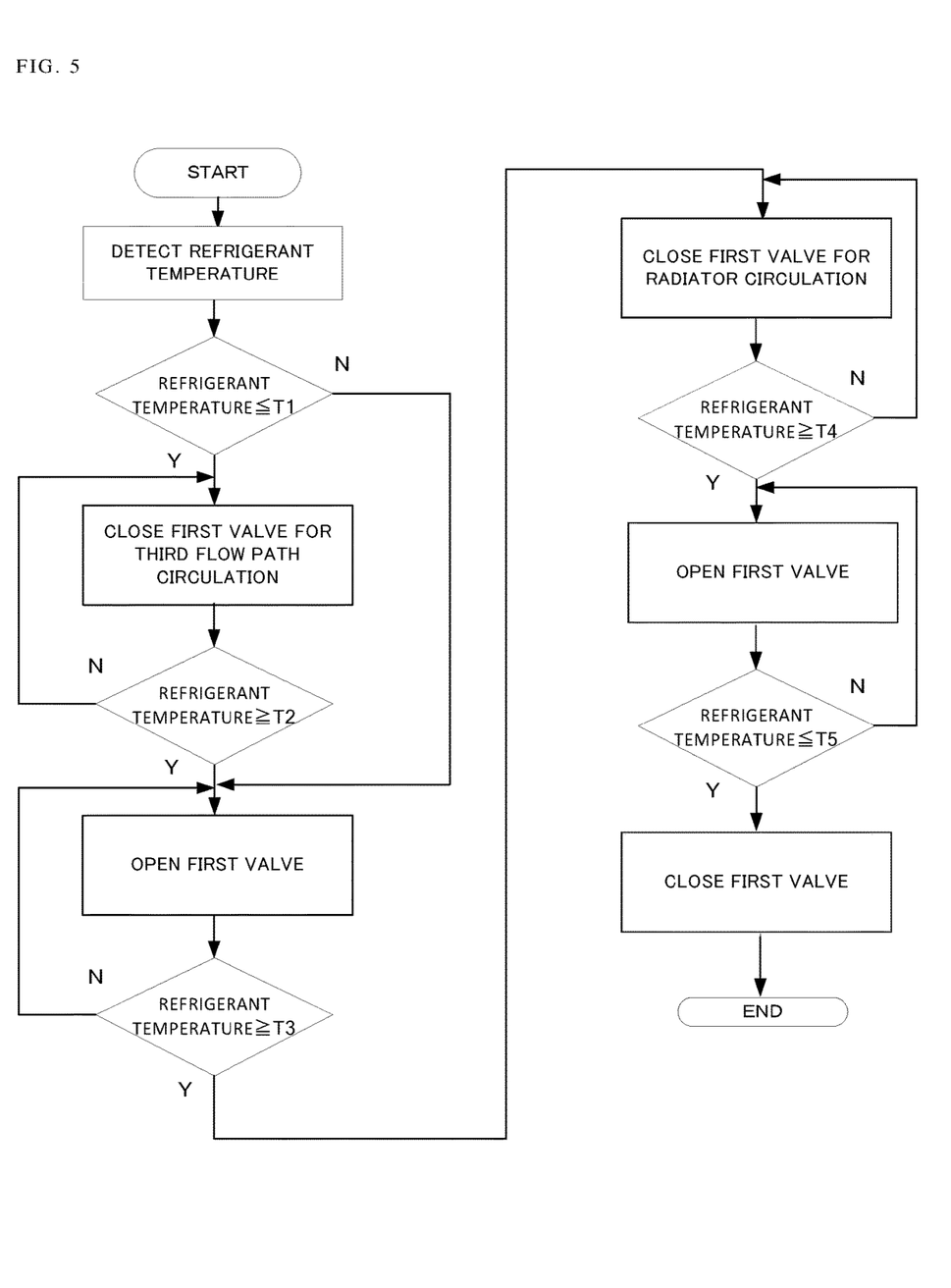
FIG. 5 is a flowchart illustrating another example of the control of the fuel cell system of the disclosed embodiments.

FIG. 5 is a flowchart illustrating another example of the control of the fuel cell system of the disclosed embodiments.

In FIG. 5, the low temperature threshold (T1) judgment (1) and the high temperature threshold (T2) judgment (2) are the same as those described above.

(3) Judgment of Second High Temperature Threshold (T3)

As needed, the second high temperature threshold (T3) judgment may be performed after the above-described high temperature threshold (T2) judgment (2).

That is, the controller may judge whether or not the temperature of the refrigerant has become equal to or more than the second high temperature threshold (T3).

Until the temperature of the refrigerant becomes equal to or more than the second high temperature threshold (T3), the controller may open the first valve, and it may maintain the third flow path circulation of the three-way valve. At this time, if the sixth flow path includes the second valve, the controller may also open the second valve from the viewpoint of enhancing the heat dissipation effect.

When the temperature of the refrigerant is judged to have become equal to or more than the second high temperature threshold (T3), the controller closes the first valve and maintains the temperature of the refrigerant in the reserve tank. At this time, the controller may switch the three-way valve to the radiator circulation. At this time, if the sixth flow path includes the second valve, the controller may also close the second valve. By closing the first valve, the temperature of the refrigerant in the reserve tank can be maintained and can be prepared so that it can be rapidly decreased when it becomes 80° C. or more, for example.

The second high temperature threshold (T3) may be set to a temperature higher than the high temperature threshold (T2).

The second high temperature threshold (T3) may be from 20° C. to 40° C., for example.

(4) Judgment of Third High Temperature Threshold (T4)

As needed, the third high temperature threshold (T4) judgment may be performed after the above-described second high temperature threshold (T3) judgment (3).

That is, the controller may judge whether or not the temperature of the refrigerant has become equal to or more than the third high temperature threshold (T4).

Until the temperature of the refrigerant becomes equal to or more than the third high temperature threshold (T4), the controller may close the first valve. At this time, if the sixth flow path includes the second valve, the controller may also close the second valve.

When the temperature of the refrigerant is judged to have become equal to or more than the third high temperature threshold (T4), the controller opens the first valve and circulates the refrigerant to flow through the reserve tank for a predetermined time. At this time, if the sixth flow path includes the second valve, the controller may also open the second valve from the viewpoint of enhancing the heat dissipation effect.

The third high temperature threshold (T4) may be set to a temperature higher than the second high temperature threshold (T3).

The third high temperature threshold (T4) may be from 70° C. to 90° C., for example.

(5) Judgment of Fourth High Temperature Threshold (T5)

As needed, the fourth high temperature threshold (T5) judgment may be performed after the above-described third high temperature threshold (T4) judgment and after the elapse of a predetermined time.

That is, the controller may judge whether or not the temperature of the refrigerant has become equal to or less than the fourth high temperature threshold (T5).

Until the temperature of the refrigerant becomes equal to or less than the fourth high temperature threshold (T5), the controller may open the first valve. At this time, if the sixth flow path includes the second valve, the controller may also open the second valve from the viewpoint of enhancing the heat dissipation effect.

When the temperature of the refrigerant is judged to have become equal to or less than the fourth high temperature threshold (T5), the controller closes the first valve. At this time, if the sixth flow path includes the second valve, the controller may also close the second valve. By closing the first valve, the temperature of the reserve tank can be kept at low temperature and can be prepared for rapid heat dissipation at the time when the temperature of the reserve tank becomes equal to or more than the third high temperature threshold (T4) next time.

The fourth high temperature threshold (T5) may be set to a temperature lower than the third high temperature threshold (T4).

The fourth high temperature threshold (T5) may be 70° C. or less, or it may be 60° C. or less, for example. The predetermined time may be appropriately set according to the target temperature or the like of the refrigerant.

REFERENCE SIGNS LIST

10: Fuel cell
21: First flow path (upstream pipe)
22: Second flow path (downstream pipe)
23: Third flow path (bypass pipe)
24: Fourth flow path (pipe a)
25: Fifth flow path (pipe c)
26: Sixth flow path (pipe b)
30: Radiator
40: Reserve tank
50: Refrigerant circulation pump
60: Thermometer
70: Three-way valve
71: First valve
72: Second valve
80: Controller

The invention claimed is:

1. A fuel cell system comprising a fuel cell, a radiator, a thermometer, a reserve tank, a first flow path (an upstream pipe), a second flow path (a downstream pipe), a three-way valve, a third flow path (a bypass pipe), a refrigerant circulation pump, a fourth flow path (a pipe a), a fifth flow path (a pipe c) and a controller, wherein the radiator decreases a temperature of a refrigerant for cooling the fuel cell;
wherein the thermometer measures the temperature of the refrigerant;
wherein the reserve tank stores the refrigerant;

wherein the first flow path (the upstream pipe) allows the refrigerant to flow from the fuel cell to the radiator, wherein the second flow path (the downstream pipe) allows the refrigerant to flow from the radiator to the fuel cell, wherein the three-way valve is disposed in the first flow path and branches the first flow path;

wherein the third flow path (the bypass pipe) allows the refrigerant to bypass the radiator and flow from the three-way valve to the second flow path;

wherein the refrigerant circulation pump is disposed downstream from a junction of the second flow path with the third flow path;

wherein the fourth flow path (the pipe a) allows the refrigerant to flow from the first or third flow path to the reserve tank;

wherein the fifth flow path (the pipe c) allows the refrigerant to flow from the reserve tank to the second flow path, or it allows the refrigerant to flow from the reserve tank to downstream from a branch point of the third flow path to the fourth flow path;

wherein at least one flow path selected from the group consisting of the fourth flow path and the fifth flow path includes a first valve;

wherein, by controlling the three-way valve, the controller switches to any one of the following circulation systems: radiator circulation in which the refrigerant flows to the radiator through the first flow path, and third flow path circulation in which the refrigerant bypasses the radiator and flows to the second flow path through the third flow path;

wherein, when the temperature of the refrigerant is equal to or less than a low temperature threshold, the controller switches from the radiator circulation to the third flow path circulation and closes the first valve;

wherein, when the temperature of the refrigerant becomes equal to or more than a high temperature threshold, the controller opens the first valve and circulate the refrigerant to flow through the reserve tank;

wherein the fuel cell system includes a sixth flow path (a pipe b) through which the refrigerant flows from an inlet or outlet of the radiator to the reserve tank;

wherein the sixth flow path (the pipe b) includes a second valve;

wherein, when the temperature of the refrigerant is equal to or less than the low temperature threshold, the controller switches from the radiator circulation to the third flow path circulation and closes the first valve and the second valve; and wherein, when the temperature of the refrigerant becomes equal to or more than the high temperature threshold, the controller opens the first valve and the second valve and circulates the refrigerant to flow through the reserve tank.

2. The fuel cell system according to claim 1, wherein the fourth flow path includes the first valve.

* * * * *